United States Patent
Chen et al.

(10) Patent No.: US 11,443,571 B2
(45) Date of Patent: Sep. 13, 2022

(54) MONITORING FREQUENCY SETTING METHOD AND DEVICE

(71) Applicant: Gree Electric Appliances, Inc. of Zhuhai, Guangdong (CN)

(72) Inventors: Daoyuan Chen, Guangdong (CN); Lei Peng, Guangdong (CN); Lunfu Zhong, Guangdong (CN)

(73) Assignee: Gree Electric Appliances, Inc. of Zhuhai, Zhuhai (CN)

( * ) Notice: Subject to any disclaimer, the term of this patent is extended or adjusted under 35 U.S.C. 154(b) by 26 days.

(21) Appl. No.: 17/257,431

(22) PCT Filed: Dec. 20, 2018

(86) PCT No.: PCT/CN2018/122259
§ 371 (c)(1),
(2) Date: Dec. 31, 2020

(87) PCT Pub. No.: WO2020/019649
PCT Pub. Date: Jan. 30, 2020

(65) Prior Publication Data
US 2021/0225101 A1 Jul. 22, 2021

(30) Foreign Application Priority Data
Jul. 25, 2018 (CN) .......................... 201810833137.3

(51) Int. Cl.
*G07C 9/00* (2020.01)
*B60R 25/20* (2013.01)
*G06F 21/50* (2013.01)

(52) U.S. Cl.
CPC .......... *G07C 9/00309* (2013.01); *B60R 25/20* (2013.01); *G06F 21/50* (2013.01); *G06F 2221/0775* (2013.01)

(58) Field of Classification Search
CPC ..... G07C 9/00309; B60R 25/20; G06F 21/50; G06F 2221/0775
See application file for complete search history.

(56) References Cited

U.S. PATENT DOCUMENTS

| | | | |
|---|---|---|---|
| 2014/0172184 A1 | 6/2014 | Schmidt et al. | |
| 2015/0161834 A1* | 6/2015 | Spahl | G07C 9/28 340/5.61 |
| 2019/0034022 A1* | 1/2019 | Zhang | G06F 1/3206 |

FOREIGN PATENT DOCUMENTS

| | | | |
|---|---|---|---|
| CN | 103294158 A | * | 9/2013 |
| CN | 103294158 A | | 9/2013 |
| CN | 104699223 A | | 6/2015 |

(Continued)

OTHER PUBLICATIONS

International Search Report, dated Apr. 10, 2019, in International application No. PCT/CN2018/122259, filed on Dec. 20, 2018 (4 pages).

(Continued)

*Primary Examiner* — Nabil H Syed
(74) *Attorney, Agent, or Firm* — McAndrews, Held & Malloy, Ltd.

(57) ABSTRACT

The present disclosure relates to a monitoring frequency setting method and device. The method includes that: a usage log of a controlled device is acquired; and a monitoring frequency of the controlled device is adjusted according to the usage log.

19 Claims, 2 Drawing Sheets

A usage log of a controlled device is acquired — 101 a monitoring frequency of the controlled device is adjusted according to the usage log — 102

(56) References Cited

FOREIGN PATENT DOCUMENTS

| CN | 106056712 | A | * | 10/2016 | |
|----|-----------|---|---|---------|--|
| CN | 106056712 | A |   | 10/2016 | |
| CN | 106527664 | A |   | 3/2017  | |
| CN | 106549833 | A | * | 3/2017  | |
| CN | 106549833 | A |   | 3/2017  | |
| CN | 107241788 | A |   | 10/2017 | |
| CN | 107306283 | A |   | 10/2017 | |
| CN | 107748697 | A |   | 3/2018  | |
| CN | 107861769 | A |   | 3/2018  | |
| EP | 2624098   | A3 |  | 8/2013  | |
| KR | 100869329 | B1 |  | 11/2008 | |
| WO | WO-2007134675 | A1 | * | 11/2007 | ................ B60J 5/00 |

OTHER PUBLICATIONS

Office action of the priority China Patent Application No. 201810833137.3 filed Jul. 25, 2018 (5 pages).

* cited by examiner

MONITORING FREQUENCY SETTING METHOD AND DEVICE

CROSS-REFERENCE TO RELATED APPLICATION

The present disclosure is a 371 application of International Patent Application No. PCT/CN2018/122259, filed Dec. 20, 2018, which claims priority to Chinese Patent Application No. 201810833137.3, filed on Jul. 25, 2018 and named after "Monitoring Frequency Setting Method and Device". Contents of the present disclosure are hereby incorporated by reference in entirety of the Chinese Patent Application.

TECHNICAL FIELD

The present disclosure relates to the technical field of smart home, in particular to a monitoring frequency setting method and device.

BACKGROUND

Intelligent locks are applied more and more widely, and there are various intelligent locks on the market. The intelligent lock is generally equipped with fingerprint (biometric recognition, vein recognition, etc.), password, magnetic card, APP control, remote control and other unlocking ways. Compared with the traditional mechanical lock, the intelligent lock has great progress in safety, convenience and other aspects. At present, because the intelligent lock needs to keep scanning to see whether someone uses fingerprint, password, magnetic card and other unlocking way to input a unlocking instruction, the intelligent lock is generally powered by at least one battery. An important parameter of the intelligent lock is a scanning frequency, that is, a number of times the intelligent lock scans to see if there is any input in unit time. when the scanning frequency is high, the number of times of scanning in unit time is large, and the power consumption of the intelligent lock is high.

In a related technology, in order to ensure a sensitivity of the intelligent lock, the scanning frequency is usually set very high. The intelligent lock is constantly scanning to see if there is a signal input to unlock the lock, so as to ensure that when someone unlocks, it can respond immediately rather than taking a while. This way ensures the high sensitivity of the intelligent lock, but also leads to the high power consumption of the intelligent lock, and the battery is not durable. However, the scanning frequency of the intelligent lock cannot be set too low, otherwise it lags in response when some unlocks.

SUMMARY

According to a first aspect of the embodiments of the present disclosure, a monitoring frequency setting method is provided, which may include that:

a usage log of a controlled device is acquired; and a monitoring frequency of the controlled device is adjusted according to the usage log.

According to a second aspect of the embodiments of the present disclosure, a monitoring frequency setting method is provided, which may include that:

a monitoring frequency sent by the control terminal is received, the monitoring frequency being determined by the control terminal according to the usage log of the controlled device; and operation is performed according to the monitoring frequency.

According to third aspect of the embodiments of the present disclosure, an intelligent device is provided, which may include: a control device. The control device at least includes the following modules:

a receiving component, configured to receive the monitoring frequency sent by the control terminal, the monitoring frequency being determined by the control terminal according to the usage log of the controlled device; and an execution component, configured to operate according to the monitoring frequency.

It should be understood that the above general descriptions and detailed descriptions below are only exemplary and explanatory and are not intended to limit the present disclosure.

DETAILED DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
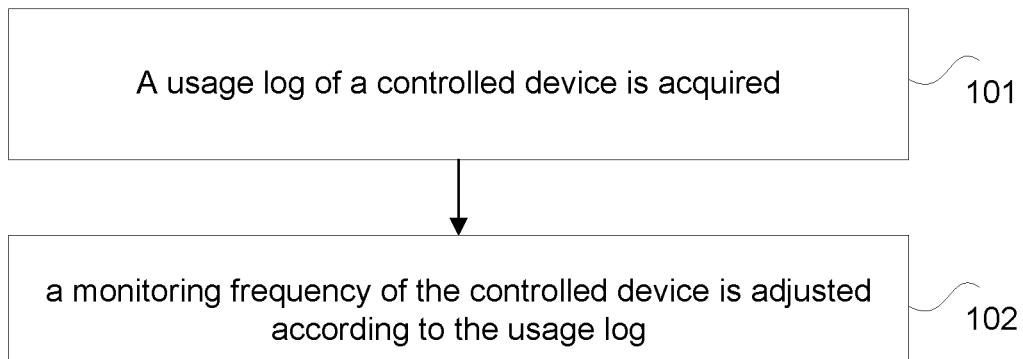
FIG. 1 is a flowchart of a monitoring frequency setting method according to an exemplary embodiment.

FIG. 1 is a flowchart of a monitoring frequency setting method according to an exemplary embodiment. The method is applied to a control terminal and may include the following steps.

At S101, a usage log of a controlled device is acquired.

At S102, a monitoring frequency of the controlled device is adjusted according to the usage log.

By means of the method in the present disclosure, the monitoring frequency of the controlled device at different time periods may be adjusted according to the usage log of the controlled device, so as to be that the controlled device has no need to always operate at a very high monitoring frequency, thereby electricity of the controlled device is saved, and the service life of a battery in the controlled device is prolonged.

The method may be applied to an intelligent lock, and a scanning frequency of the intelligent lock is the monitoring frequency in the method. The method can solve the problem that the power consumption of the intelligent lock is too high when a scanning frequency is set too high, and the intelligent lock is insensitive when the scanning frequency is set too low. By adjusting the scanning frequency of the intelligent lock, the power consumption of the intelligent lock can be reduced and the battery life of the intelligent lock can be prolonged without affecting the sensitivity of the intelligent lock to receive an unlocking signal.

Figure 2:
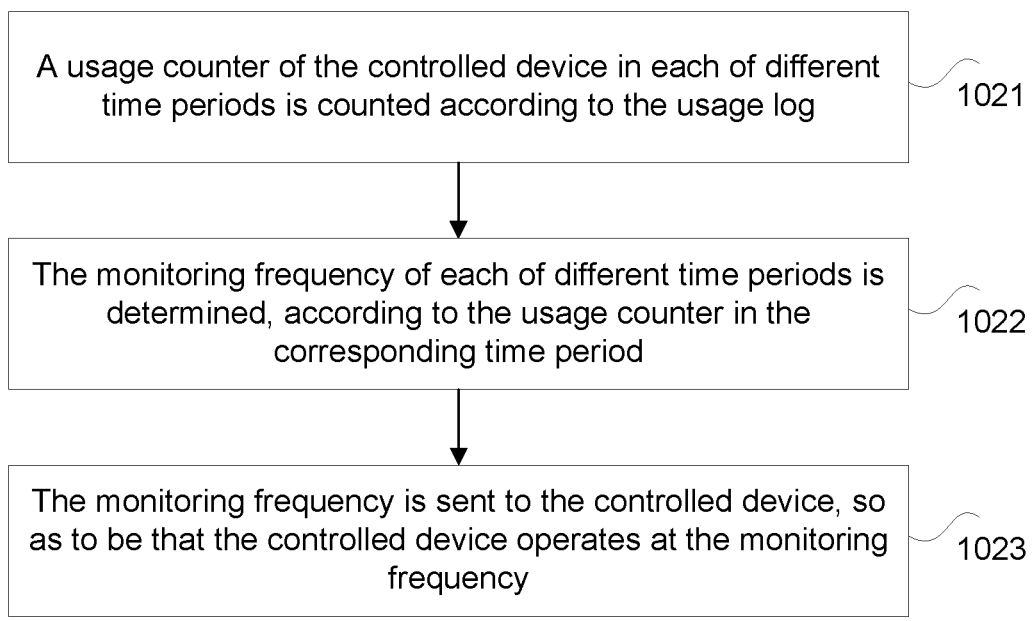
FIG. 2 is a specific flowchart of S102 in FIG. 1.

As shown in FIG. 2, in some embodiments, that the monitoring frequency of the controlled device is adjusted according to the usage log at S102 may include the following steps.

At S1021, a usage counter of the controlled device in each of different time periods is counted according to the usage log.

At S1022, the monitoring frequency of each of different time periods is determined, according to the usage counter in the corresponding time period.

At S1023, the monitoring frequency is sent to the controlled device, as to indicate the controlled device to operate according to the monitoring frequency.

In the method, it is needed to divide a whole day into several time periods, and then the usage log is counted and analyzed, and further a specific monitoring frequency that should be used in each of different time periods is determined.

In some embodiments, the monitoring frequency is positively correlated with the usage counter.

It is easy to understand that the greater the usage counter in a given time period, the higher the monitoring frequency should be. In a time period of frequency use, the intelligent lock is required to be more responsive, so as to meet the user's use experience, but in a time period of less use, even if the response of the intelligent lock is relatively slow, the user's use experience is greatly affected.

In some embodiments, that the monitoring frequency of each of different time periods is determined according to the usage counter in the corresponding time period at S1022 may include the following steps.

A weight of each of different time periods is determined according to the usage counter in the corresponding time period; and the monitoring frequency of each of different time periods is determined according to the weight.

The weight is positively correlated with the usage counter.

In some embodiments, that the weight of each of different time periods is determined according to the usage counter in the corresponding time period may include the following steps.

The usage counter in each of different time periods is divided by a time length in the corresponding time period to calculate a usage frequency of in the corresponding time period; and the usage frequency is determined as the weight in the corresponding time period.

In some embodiments, that the monitoring frequency of each of different time periods is determined according to the weight may include the following steps.

A preset mapping relationship table is read, the mapping relationship table recording a corresponding relationship between the weight of and the monitoring frequency; and the monitoring frequency of each of different time periods is determined according to the mapping relationship table.

After a positive correlation between the usage counter and the monitoring frequency is determined, it is further needed to determine a specific corresponding relation of values between the usage counter and the monitoring frequency. There is no fixed optimal solution for the corresponding relationship, and depending on an actual situation, as long as a more appropriate value is determined based on the user's use experience.

In some embodiments, the method may further include the following step.

After a preset first period, the weight of each of different time periods in a current first period is redetermined according to an acquired usage log in a previous first period.

Considering that the user's schedule is likely to change, there is a dynamic adjustment mechanism in the method. That is, every once in a while, for example, a week or a month, the weight of each of different time periods is redetermined according to the usage log in the time period, and when the monitoring frequency corresponding to the weight is determined to change, the monitoring frequency is updated.

In some embodiments, that the weight of each of different time periods in the current first period is redetermined at S103 may include the following steps.

The weight of each of different time periods in the previous first period is iteratively updated by a neural network model to obtain the weight of each of different time periods in the current first period. The neural network model is a perception model.

In order to adapt to a more complex actual situation, the weight of each of different time periods may be updated iteratively by means of the neural network model, specifically the perception model, so as to realize a dynamic adjustment of the monitoring frequency.

In some embodiments, that the usage log of the controlled device is acquired at S101 may include the following step.

The usage log data packet sent by the controlled device is received, the data packet recording a usage time period the controlled device.

In some embodiments, that the usage log data packet sent by the controlled device is received may include the following step.

The usage log data packet sent by the controlled device in each time when the controlled device is used is received, the data packet including a current usage time; or the usage log data packet sent by the controlled device at a preset second period is received, the data packet including each usage time period in a current second period.

For the controlled device, different ways may be set to send the usage log. For example, the usage log of this time may be sent to the control terminal in real time after each use. A time period, for example, an hour, a day, etc., may also be set, and after each of different time periods, the usage log within the time period is packed and sent. It should be noted that the second period is different from the first period above, and the second period cannot be greater than the first period, so as to ensure that the dynamic adjustment is not affected.

In some embodiments, that the monitoring frequency of the controlled device is adjusted according to the usage log may include that:

when the usage log is a usage log under multiple usage categories, the monitoring frequency of each of the plurality of the usage category of the controlled device is adjusted according to the usage log under each of the plurality of the usage categories.

In some embodiments, the multiple usage categories include working day and non-working day.

Considering that users have different sleep and rest patterns in each of different time periods, such as the working days and the non-working days, different types of days may be set according to different schemes.

An intelligent lock is taken as an example, the method of the present disclosure is further elaborated below.

Figure 3:
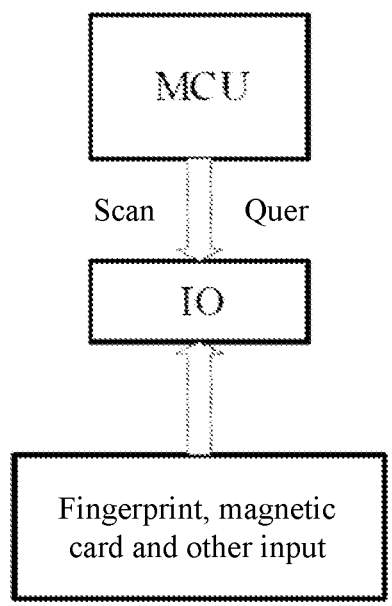
FIG. 3 is a block diagram of an internal circuit of an intelligent lock according to an exemplary embodiment.

FIG. 3 is a model for querying if there is an unlocking instruction input in the intelligent lock, in which MCU constantly queries and scans 10 to see if there is a signal input, which results in a high scanning frequency of the intelligent lock and the high power consumption of the intelligent lock.

Figure 4:
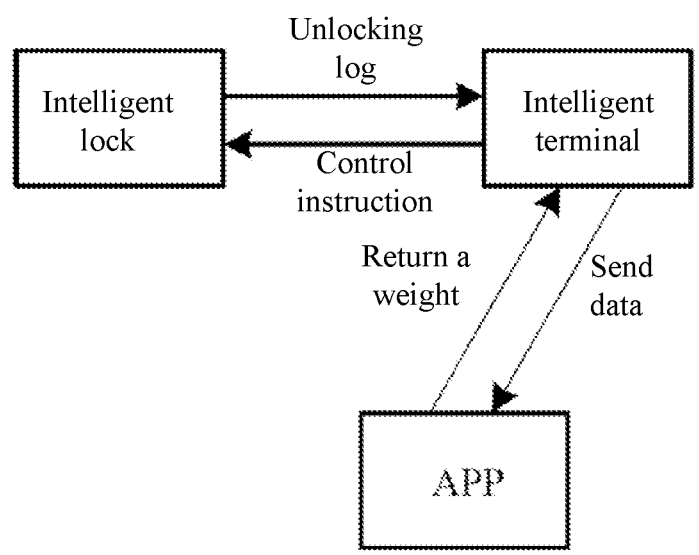
FIG. 4 is a flowchart of signal transmission in a method for setting a scanning frequency of an intelligent lock according to an exemplary embodiment.

FIG. 4 is a signal transmission process in which the intelligent lock adjusts the scanning frequency according to the user's habits. The intelligent lock records unlocking time in each time the user unlocks, and then packs and sends it to an intelligent terminal. An APP installed on the intelligent terminal processes the data and obtains the weights of different time periods. The intelligent terminal sends a control instruction to the intelligent lock according to the weights, so as to modify the scanning frequency of the intelligent lock.

Before the intelligent terminal modifies the scanning frequency of the intelligent lock, there is an initial scanning frequency the intelligent lock and the intelligent lock operates according to an initial scanning frequency. After a period of use, the scanning frequency may be adjusted according to actual use.

In a data processing process, the whole day should first be divided into 7 time periods, such as 6:30-8:30, 8:30-11:30, 11:30-1:30, 13:30-17:30, 17:30-19:30, 19:30-22:30 and 22:30-6:30 respectively, the number of times S of the user unlocking in these time periods is counted, and the number of times S/T of unlocking in unit time is calculated as an initial value of the weight, while the scanning frequency of the intelligent lock is set according to the weight.

A mapping relationship table between the weight and the scan frequency is shown below:

| Weight | <0.5 | 0.5-1 | 1-3 | 3-5 | 6-10 | >10 |
|---|---|---|---|---|---|---|
| Frequency/Hz | 0.5 | 1 | 2 | 4 | 10 | 100 |

An approximate scanning frequency of different time periods is determined according to the counted number of times of unlocking in unit time, then, the weight is iterated by means of a perception algorithm $w(k+1)=w(k)+cx$ to continuously update the weight. When the weight tends to be stable and changes little, the time periods are divided and set again.

The scanning frequency of the intelligent lock in each of different time periods is set according to the rules and habits of the user's daily life. The scanning frequency is set a little higher when the user opens the intelligent lock more frequently, and set a little lower when the user opens the door less or hardly opens the intelligent lock. For example, current office workers go out in the morning and go back home in the afternoon or evening, and they are mostly not at home at noon. In this case, time of unlocking generally concentrates in the morning and afternoon, so at the noon when they hardly open the intelligent lock, a low scanning frequency may be set to reduce the power consumption and make the battery more durable.

In addition, when the intelligent lock is set in the same way every day, there is bound to be a problem. For example, holiday schedule is usually different from working day, so an unlocking time of the holiday and an unlocking time of the working day must be different. Therefore, it is necessary to make continuous and circular statistics to the locking time, and differentiated setting is more precise.

Figure 5:
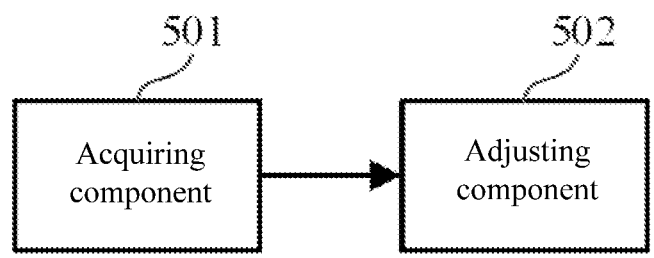
FIG. 5 is a block diagram of a circuit of a monitoring frequency setting apparatus according to an exemplary embodiment.

FIG. 5 is a block diagram of a circuit of a monitoring frequency setting apparatus according to an exemplary embodiment. Referring to FIG. 5, the apparatus includes an acquiring component 501 and an adjusting component 502.

The acquiring component 501 is configured to acquire the usage log of the controlled device.

The adjusting component 502 is configured to adjust the monitoring frequency of the controlled device according to the usage log.

In some embodiments, the adjusting component 502 includes: a counting component, a determining component, and a sending component.

The counting component is configured to count the usage counter in each of different time periods according to the usage log.

The determining component is configured to determine, according to the usage counter in the corresponding time period, the monitoring frequency of each of different time periods.

The sending component is configured to send the monitoring frequency to the controlled device, as to indicate the controlled device to operate according to the monitoring frequency.

In some embodiments, the monitoring frequency is positively correlated with the usage counter.

In some embodiments, the determining component is specifically configured to:

determine a weight of each of different time periods according to the usage counter in the corresponding time period; and determine the monitoring frequency of each of different time periods according to the weight.

The weight is positively correlated with the usage counter in each of different time periods.

In some embodiments, the determining component is specifically configured to:

divide the usage counter in each of different time periods by a time length in the corresponding time period to calculate a usage frequency in the corresponding time period; and determine the usage frequency of each of different time periods as the weight of each of different time periods.

In some embodiments, the determining component is specifically configured to:

read the preset mapping relationship table, the mapping relationship table recording a corresponding relationship between the weight and the monitoring frequency; and determine the monitoring frequency of each of different time periods according to the mapping relationship table.

In some embodiments, the apparatus may further include:

an updating component, configured to redetermine, after a preset first period, the weight of each of different time periods in a current first period according to an acquired usage log in the previous first period.

In some embodiments, the updating component is specifically configured to:

iteratively update the weight of each of different time periods in the previous first period by a neural network model to obtain the weight of each of different time periods in the current first period. The neural network model is a perception model.

In some embodiments, the acquiring component 501 is specifically configured to:

receive the usage log data packet sent by the controlled device, the data packet recording a usage time period the controlled device.

In some embodiments, the acquiring component 501 is specifically configured to:

receive the usage log data packet sent by the controlled device in each time when the controlled device is used, the data packet including a current usage time period; or receive the usage log data packet sent by the controlled device at a preset second period, the data packet including each usage time period in a current second period.

In some embodiments, the adjusting component 502 is further configured to:

when the usage log is a usage log under multiple usage categories, adjust the monitoring frequency of each of the multiple usage categories of the controlled device according to the usage log under each of the multiple usage categories.

In some embodiments, the multiple usage categories include working day and non-working day.

With regard to the apparatus in the above embodiments, the specific method of each component performing operations has been described in detail in the embodiments of the method, so it will not be repeated here.

The present disclosure also provides the following embodiments.

A control terminal is provided, which includes a control device. The control device at least includes the following components:

an acquiring component, configured to acquire the usage log of the controlled device; and an adjusting component, configured to adjust the monitoring frequency of the controlled device according to the usage log.

The present disclosure also provides the following embodiment.

A monitoring frequency setting method is provided, which may include that:

the monitoring frequency sent by a control terminal is received, the monitoring frequency being determined by the control terminal according to a usage log of a controlled device; and operation is performed according to the monitoring frequency.

In some embodiments, the method may further include that:

the usage log of the control vehicle is sent to the control terminal.

The present disclosure also provides the following embodiment.

A monitoring frequency setting device is provided, which includes a receiving component and an execution component.

The receiving component is configured to receive the monitoring frequency sent by the control terminal, the monitoring frequency being determined by the control terminal according to the usage log of a controlled device.

The execution component is configured to operate according to the monitoring frequency.

The present disclosure also provides the following embodiments.

An intelligent device is provided, which includes a control device. The control device at least includes the following modules:

a receiving component, configured to receive the monitoring frequency sent by the control terminal, the monitoring frequency being determined by the control terminal according to the usage log of the controlled device; and an execution component, configured to operate according to the monitoring frequency.

In some embodiments, the device is an intelligent lock.

It should be understandable that the same or similar parts of the above embodiments may be referred to each other, and those not specified in some embodiments may be referred to the same or similar contents in other embodiments.

It should be noted that in the description of the present disclosure, terms "first", "second" and the like are used for descriptive purposes only and are not to be construed as indicating or implying relative importance. Further, in the description of the present disclosure, the meaning of "multiple" is at least two unless otherwise specified.

Any process or method in the flowcharts or described herein in another manner may be understood to represent a component, segment or part including codes of at least one executable instruction configured to realize specific logic functions or steps of the process and, moreover, the scope of the preferred implementation mode of the disclosure includes other implementation, not in a sequence shown or discussed herein, including execution of the functions basically simultaneously or in an opposite sequence according to the involved functions. This should be understood by those skilled in the art of the embodiments of the disclosure.

It should be understood that each part of the disclosure may be implemented by hardware, software, firmware or a combination thereof. In the above embodiments, multiple steps or methods may be implemented by software or firmware stored in a memory and executed by a proper instruction execution system. For example, in case of implementation with the hardware, like another embodiment, any one or combination of the following technologies well-known in the art may be adopted for implementation: a discrete logic circuit with a logic gate circuit configured to realize a logic function for a data signal, an disclosure-specific integrated circuit with a proper combined logic gate circuit, a Programmable Gate Array (PGA), a Field Programmable Gate Array (FPGA) and the like.

Those of ordinary skill in the art should understand that all or part of the steps in the method of the above embodiment may be completed through related hardware instructed by a program, the program may be stored in a non-transitory storage medium, and when the program is executed, one or combination of the steps of the method embodiments is included.

In addition, each functional unit in each embodiment of the present disclosure may be integrated into a processing module, each unit may also physically exist independently, and two or more than two units may also be integrated into a component. The integrated module may be realized in form of hardware or in form of software function component. When the integrated unit is implemented by software function components, and the software function components are sold or used as independent products, they can also be stored in the non-transitory storage medium.

The non-transitory storage media mentioned above may be an ROM, a disk or a compact disc, etc.

In the descriptions of the specification, the descriptions made with reference to terms "an embodiment", "some embodiments", "example", "specific example", "some examples" or the like refer to that specific features, structures, materials or characteristics described in combination with the embodiment or the example are included in at least one embodiment or example of the disclosure. In the specification, a schematic representation of the above terms does not necessarily refer to the same embodiment or example. Moreover, the specific described features, structures, materials or characteristics may be combined in a proper method in any one or more embodiments or examples.

Although the embodiments of the present disclosure are shown and described above, it should be understandable that the above embodiments are exemplary and not to be construed as limitations of the present disclosure, and those of ordinary skill in the art may make changes, modifications, replacements and variations of the above embodiments within the scope of the present disclosure.

What is claimed is:

1. A monitoring frequency setting method, comprising:
   acquiring a usage log of a controlled device; and
   adjusting a monitoring frequency of the controlled device according to the usage log;
   wherein adjusting the monitoring frequency of the controlled device according to the usage log comprises:
   counting a usage counter of the controlled device in each of different time periods according to the usage log;
   determining the monitoring frequency of each different time periods according to the usage counter in the corresponding time period.

2. The monitoring frequency setting method as claimed in claim 1, wherein the monitoring frequency is positively correlated with the usage counter.

3. The monitoring frequency setting method as claimed in claim 2, wherein determining the monitoring frequency of each of different time periods according to the usage counter in the corresponding time period comprises:
   determining a weight of each of different time periods according to the usage counter in the corresponding time period;
   determining the monitoring frequency of each of different time periods according to the weight, wherein the weight is positively correlated with the usage counter.

4. The monitoring frequency setting method as claimed in claim 3, wherein determining the weight of in each of different time periods according to the usage counter in the corresponding time period comprises:
   dividing the usage counter in each of different time periods by a time length in the corresponding time period to calculate a usage frequency in the corresponding time period; and
   determining the usage frequency as the weight in the corresponding time period.

5. The monitoring frequency setting method as claimed in claim 3, wherein determining the monitoring frequency of each of different time periods according to the weight comprises:
   reading a preset mapping relationship table, the mapping relationship table recording a corresponding relationship between the weight and the monitoring frequency; and
   determining the monitoring frequency of each of different time periods according to the mapping relationship table.

6. The monitoring frequency setting method as claimed in claim 4, further comprising:
   after a preset first period, redetermining the weight of each of different time periods in a current first period according to an acquired usage log in a previous first period.

7. The monitoring frequency setting method as claimed in claim 6, wherein redetermining the weight of each of different time periods in the current period comprises:
   iteratively updating the weight of each of different time periods in the previous first period by a neural network model to obtain the weight of each of different time periods in the current first period, wherein the neural network model is a perception model.

8. The monitoring frequency setting method as claimed in claim 1, wherein acquiring the usage log of the controlled device comprises:
   receiving a usage log data packet sent by the controlled device, the data packet recording a usage time period of the controlled device.

9. The monitoring frequency setting method as claimed in claim 8, wherein receiving the usage log data packet sent by the controlled device comprises:
   receiving the usage log data packet sent by the controlled device in each time when the controlled device is used, the data packet comprising a current usage time period; or
   receiving the usage log data packet sent by the controlled device at a preset second period, the data packet comprising each usage time period in a current second period.

10. The monitoring frequency setting method as claimed in claim 1, wherein adjusting the monitoring frequency of the controlled device according to the usage log comprises:
    when the usage log is a usage log under a plurality of usage categories, adjusting the monitoring frequency of each of the plurality of the usage categories of the controlled device according to the usage log under each of the plurality of the usage categories.

11. The monitoring frequency setting method as claimed in claim 10, wherein the plurality of usage categories comprise working day and non-working day.

12. A monitoring frequency setting method, comprising:
    receiving a monitoring frequency sent by a control terminal, the monitoring frequency being determined by the control terminal according to a usage log of a controlled device; and
    operating according to the monitoring frequency;
    wherein the control terminal is configured to count a usage counter of the controlled device in each of different time periods according to the usage log, and determine the monitoring frequency of each of different time periods according to the usage counter in the corresponding time period.

13. The monitoring frequency setting method as claimed in claim 12, further comprising:
    sending the usage log of the controlled device to the control terminal.

14. An intelligent device, comprising: a controlled device, which at least comprises the following modules:
    a receiving component, configured to receive a monitoring frequency sent by a control terminal, the monitoring frequency being determined by the control terminal according to a usage log of the controlled device; and
    an execution component, configured to operate according to the monitoring frequency;
    wherein the control terminal is configured to count a usage counter of the controlled device in each of different time periods according to the usage log, and determine the monitoring frequency of each of different time periods according to the usage counter in the corresponding time period.

15. The intelligent device as claimed in claim 14, wherein the device is an intelligent lock.

16. The monitoring frequency setting method as claimed in claim 1, further comprising:
    sending the monitoring frequency to the controlled device, as to indicate the controlled device to operate according to the monitoring frequency.

17. The monitoring frequency setting method as claimed in claim 5, further comprising:

after a preset first period, redetermining the weight of each of different time periods in the current first period according to the acquired usage log in the previous first period.

18. The monitoring frequency setting method as claimed in claim 6, further comprising:
after a preset first period, redetermining the weight of each of different time periods in the current first period according to the acquired usage log in the previous first period.

19. The monitoring frequency setting method as claimed in claim 1, wherein acquiring the usage log of the controlled device comprises:
receiving a usage log data packet sent by the controlled device, the data packet recording the usage time period of the controlled device.

* * * * *